Patented Aug. 29, 1939

2,171,395

UNITED STATES PATENT OFFICE 2,171,395

TREATMENT OF RUBBER

Ernest Harold Farmer, Hertfordshire, and Henry Potter Stevens and James Walker Rowe, London Bridge, England, assignors, by mesne assignments, to The British Rubber Producers' Research Association, London, England No Drawing. Application February 1, 1937, Serial No. 123,546. In Great Britain May 4, 1936

12 Claims. (Cl. 260—110)

This invention relates to the treatment of rubber for the production of modified rubber or rubber derivatives.

It is well known that certain reagents, in particular oxygen, chlorine, hypochlorous acid, sulphuric acid, certain sulphonic acids, hydrochloric acid and also certain metallic compounds such as chlorostannic acid have a profound effect on rubber converting it into products whose physical and chemical properties differ very considerably from raw rubber from which they are derived. These products are frequently obtained by the regulation action of the reagents on the rubber in a suitable solvent both with and without catalysts. The products vary in solubility and physical properties in accordance with the concentration of the reagent in its relation to the rubber and the temperature at which the reaction proceeds. No two products are quite alike and the reagent is chosen to suit the material it is desired to produce.

The reactions which take place in these cases have been the subject of investigations, without any very certain conclusions being reached but it is generally agreed that the products comprise addition and substitution compounds possibly accompanied by oxidation and cyclisation of varying degree. In some cases oxidation or cyclisation appears to predominate.

Now it has been found that the above reagents do not comprise all the reagents capable of modifying the chemical and physical properties of rubber and that chlorine compounds may in certain instances be replaced by fluorine compounds, in particularly boron trifluoride. When this substance is added to a solution of rubber in an inert organic solvent such as benzene in the presence of a dehydrating agent such as acetic acid or in a solvent dried as by distillation of a part thereof, or when it is added to a solution of rubber dried by the distillation of a portion of the solvent, or when the solvent or solution is dried by distillation of a part thereof and a dehydrating agent such as acetic acid is also used, a profound change takes place in the chemical and physical nature of the rubber. The change can be accelerated by heating the mixture. If portions be withdrawn during the operation and shaken with an excess of aqueous sodium carbonate to stop the reaction, the solvent removed by steam distillation, the solid product separated from the aqueous solution, washed free from salts with water and then dried at a moderate temperature, for example 70° C., it is found that a gradual change takes place in the rubber which, after a short treatment becomes soft and sticky but remains soluble like the original rubber. At the next stage it becomes harder and increasingly insoluble and eventually a hard and brittle stage is reached, the product being again readily soluble in the ordinary rubber solvents. These stages may be summarised under the following headings:

(1) *Rubber stage*.—The products resemble a degraded rubber. They are soft, tacky and soluble in aromatic hydrocarbons to give a viscous solution similar to a normal rubber solution.

(2) *Intermediate or insoluble stage*.—The products are distinguished by their insolubility in aromatic hydrocarbons; they swell considerably but do not disperse either on heating or shaking. When cold they range from a product resembling a perished rubber to a hard, friable solid, but become more rubber-like on heating to 100° C. They are not tacky.

(3) *Final or soluble stage*.—Hard, brittle solids, soluble in aromatic hydrocarbons to give a solution of relatively low viscosity. There is not so much variation within this stage, but the more converted products are more brittle. By dissolving and reprecipitating with acetone or alcohol the final product is obtained in the form of a white odourless powder. This final product can be dissolved and applied as a varnish. When the solvent evaporates the product is left as a hard, transparent but brittle film. By the use of plasticisers it is possible to improve the elasticity and plasticity of the film but not to any appreciable or sufficient extent. If, however, the reaction be carried to an intermediate stage, that is far enough to go beyond the initial soft and sticky stage and just past or almost past the insoluble stage but not so far as the ultimate product there is obtained a material which is moderately plastic and yields a much improved film. The degree of reaction is mainly dependent on:—

(1) The proportion of boron trifluoride to rubber.

(2) The time and temperature of heating.

(3) The percentage of moisture in particular as controlled by the amount of dehydrating agent present.

The rate of conversion increases rapidly with increased proportions of boron trifluoride. The reaction proceeds more rapidly in some solvent than in others; thus, it goes more rapidly in benzene than in carbon tetrachloride, at their boiling points. The rate of conversion is increased by heating the reaction mixture. Moisture reduces the rate of conversion. This may be controlled for instance by the addition of acetic acid or by distilling off a part of the solvent before adding the acetic acid or even without the use of acetic acid if the solvent is thoroughly dried.

Thus the following is an example of the process using purified solvents in which the operation is carried far enough but not too far so as to produce a relatively supple and non-brittle film.

Example I 22.5 grams of milled crepe were dissolved in 430 grams carbon tetrachloride to which were added 2.25 grams of boron trifluoride dissolved in 23 grams of acetic acid. The mixture was boiled in a vessel provided with a reflux condenser for two hours. The vessel was then cooled and an aqueous solution of sodium carbonate was added to the contents until an alkaline reaction was obtained. The product was an emulsion from which the solvent was removed by steam distillation. The residue was a white friable porous mass which was washed with hot water several times until the wash water was free from salts. The water was best removed by centrifugation. The product was dried at a low temperature, namely 70° C. The yield was approximately 22.5 grams. For use as a varnish or lacquer 5 grammes of the dry product was dissolved in 12 grams of xylene to form a liquid of brushable consistency.

Speaking broadly the best results from the point of view of the production of a flexible elastic varnish or lacquer film are obtained by carrying the reaction just far enough to enable the production of a sufficiently homogeneous and viscous liquid. The solution may be facilitated by heat and mechanical working of the mass.

It has also been found that an improved product of this nature can be obtained by the use of a proportion of possibly unsaturated hydrocarbons such as are present in many crude solvents, in particular petroleum solvents, (that is to say, certain bodies which are believed to be predominately aliphatic). If the reaction be carried out using commercial solvents so as to supply a small proportion of these bodies by using commercial, that is impure crude solvents, a better, that is a more flexible and elastic film is obtained than if the reaction be carried out in pure solvents and these bodies after treatment with boron trifluoride be added subsequently thereto. It appears therefore that certain substances actually enter into and take part in the reaction and do not act solely if at all as plasticisers.

The following are examples of the process carried out with crude commercial solvents:

Example II

Using "benzol mixture" that is a motor spirit reputed to consist of equal parts of crude benzene and petroleum spirit.

24 grammes of milled crepe were dissolved in 400 grammes of benzol mixture and 2 grammes of boron trifluoride dissolved in 23 grammes of acetic acid were added. The mixture was boiled in a vessel provided with a reflux condenser for two hours. The vessel was then cooled and an aqueous solution of sodium carbonate was added to the contents until an alkaline reaction was obtained. A yellowish emulsion was produced from which the solvent was removed by steam distillation. The residue was, when hot, a soft pasty mass which stiffened considerably on cooling so that it could be washed with a water spray on a rubber washing machine of the ordinary two roller type. After removing the water soluble ingredients in this manner as completely as possible the product was dried at a low temperature, namely 70° C. A yield of 30 grammes of the dry product was obtained. For use as a varnish or lacquer the product was dissolved in an aromatic hydrocarbon.

Example III

With ordinary petrol (motor spirit).

74 grammes of milled crepe were dissolved in a mixture of 200 grammes petrol and 200 grammes pure crystallisable benzene. Some 20 grammes of the solvent was distilled off from the solution to remove any moisture. The distillate was clear showing absence of any substantial amount of moisture. To this was added 1.8 grammes of boron trifluoride dissolved in 5.9 grammes of acetic acid. The process was carried out as in the previous example but in two parts, one part heated for one hour and the other part for two hours. The yield of the combined final products was approximately relatively the same as in the previous example.

It will be seen that when using commercial solvents the yield is approximately twenty-five per cent greater than when using pure solvents and it is concluded that this increased amount of product was derived from certain substances present in the commercial solvents.

The aforementioned examples illustrate the progressive changes in the properties of the products obtained when rubber is treated with boron trifluoride; these changes comprising a rubber stage when the products resemble a degraded rubber, an intermediate or insoluble stage and a final or soluble stage when the products are hard, brittle solids soluble in aromatic hydro-carbons to give a solution of relatively low viscosity.

It has been found that the process of separation of the final product as described in Example I aforementioned, tends to cause insolubility, brittleness and other undesirable features in the final product. The steps in the process which appear to be responsible are the heat treatments during the washing of the conversion product with hot water and during the subsequent drying at 70° C.

Moreover, it has also been found that improved products are obtained when pure solvents are used, i. e. solvents which do not react with the boron trifluoride, if the steam distillation process be avoided and the products obtained without subjecting the material to prolonged heating. To this end, the use of a solution of sodium carbonate for neutralising is avoided and in its place solid sodium carbonate is employed so that it is unnecessary to heat the reaction product to remove the water.

After mixing the solution of the reaction product with this substance the neutralised liquid is separated by decantation or filtration or other suitable means. The reaction product may be obtained by evaporation of the solvent, or the solution may be concentrated by distillation of the bulk of the solvent and the resulting concentrated solution mixed with suitable solvents to form a lacquer, varnish or paint medium, or the reaction product may be precipitated by mixing the solution with a non-solvent, e. g. ethyl alcohol, which is miscible with the solvent. By these means a series of conversion products may be obtained differing in properties according to the degree of conversion, from rubber like materials to hard brittle resins. At intermediate stages of conversion tough, flexible, non-tacky products are obtained, all of which are soluble in hydrocarbon solvents.

To illustrate this method of operation the following example is given additional to those aforementioned.

Example IV 24 grams of milled crepe are dissolved in 500 gms. of pure benzene and a few gms. of solvent distilled off to remove any water.

0.48 gms. of boron trifluoride dissolved in 1 gm. of acetic acid are added and the mixture boiled under a reflux condenser for 30 minutes. Excess of solid sodium carbonate is stirred in to stop the reaction, and after allowing it to settle the clear liquid is decanted and concentrated by evaporation. The concentration is continued until it contains 12 gms. of benzene. This is then mixed with 36 gms. of xylene, when a lacquer is obtained of a viscosity suitable for application by brushing.

On heating the products thus obtained after evaporation of the solvent for periods depending on their degree of conversion they become insoluble in hydrocarbon solvents and in this state only swell in them to give a gelatinous mass. This explains the "insoluble" stage described in Example I, the conversion products having been rendered insoluble, that is presumably polymerised, by the heat treatment during their isolation. The water present in the process of neutralising and isolating the product appears to have little or no influence on preventing the product being rendered insoluble. This polymerisation by heat appears to be as stated above, greatly retarded or altogether inhibited when the material is in solution in volatile solvents or when mixed with certain solvent oils, e. g. liquid paraffin, or the oil obtained by the reaction of boron trifluoride on certain reactive constituents of certain commercial grades of solvents, e. g. those used in Examples II and III, which explains why soluble products were obtained according to the methods described in these examples.

By reacting the above mixture for a shorter period softer and more flexible films may be obtained on evaporation of the solvent from the lacquer; by reacting for a longer period harder, but more brittle films may be obtained. In general these films are clear, have good adhesion to metal, are resistant to alkalies and acids, and are thermo-plastic. In general the products of the reaction of boron trifluoride on rubber are suitable either alone or in admixture with other materials for the manufacture of moulded articles, coating compositions, films and threads. The degree of reaction must be chosen according to the properties desired in the final product and to modify it for the particular use for which it is intended. Longer reaction times give a less flexible product which is, however, more resistant to chemical attack and of a lower viscosity in solution.

The products tend to become brittle on ageing especially at raised temperatures and to prevent this certain anti-oxidants may be added e. g. hydroquinone, pyrocatechin, pyrogallol, p-aminophenol, Flextol H (the polymerised acetone-aniline product sold by Monsanto Chemicals Ltd.) and the material known under the registered trade-mark "Nonox N. S." (sold by Imperial Chemical Industries Ltd.) and V. G. B. anti-oxidants (sold by the Rubber Regenerating Co. Ltd.). Certain other anti-oxidants which are suitable for rubber have little or no effect on preventing brittleness with ageing. Coumarone resin is another material which prevents loss of flexibility on ageing.

The boron trifluoride-rubber reaction products are also miscible with the following materials in various proportions to give clear films: liquid paraffin, ester gum, rosin, paraffin wax, stearic acid, beeswax, ozokerit, carnauba wax, plasticiser 63 (sold by Scott Bader & Co. Ltd.), chlorinated naphthalene, and Shell mineral oil 132 (Shell-Mex and B. P. Ltd.) Ester gum and rosin harden the film and the others soften it.

The products are soluble in aromatic and petroleum hydrocarbons and insoluble in alcohol and in the ester type and acetone type of solvents.

They may be mixed with pigments to produce enamels or with oil soluble dyes to produce coloured lacquers.

Where it is desired to utilise the method of preparation described in Example I, viz. neutralisation with an aqueous solution of sodium carbonate followed by steam distillation of the solvent, then in order to obtain soluble tough and flexible products solvent oil may be added to the reaction mixture at some stage previous to the steam distillation. The following example illustrates this method of working.

Example V 50 gms. of milled crepe are dissolved in 1000 gms. of benzene and 15 gms. of liquid paraffin added. A few grams of solvent are distilled off to remove any water. 1.0 gms. of boron trifluoride dissolved in 1.0 gms. of acetic acid are added to the mixture which is boiled under a reflux condenser for 1 hour. The reaction is stopped by shaking with an aqueous solution of sodium carbonate and the benzene removed by steam distillation. A somewhat rubber-like product is obtained which can be washed free of salts with a water spray on an ordinary two roller rubber washing machine. After drying at 70° C. 65 gms. of a tough product is obtained which dissolves in xylene to give a lacquer which when brushed on tinplate, gives a clear film, tough, flexible and with good adhesion. This product may be used in the same way and mixed with the same materials as that obtained under Example IV.

It will be understood that the invention comprehends processes of the kind described employing a solution of boron trifluoride in acetic acid or other solvent such as alcohol, with consequent great economy in time and materials when converting rubber for use as a lacquer, varnish or paint medium.

Also that fluorine compounds of phosphorus may be utilised in place of the boron fluorine compounds as illustrated by the following examples:

Example VI 200 gms. of a dry 5% solution of rubber in toluene are heated on a steam bath and then treated with a few bubbles of phosphorous pentafluoride. The solution, which rapidly reddens, is heated on a steam bath for a further hour at the end of which time it is almost black.

The product is isolated by precipitation into rectified spirit. 9 gms. of a light yellow powder are obtained. The powder is soluble in benzene and insoluble in acetone.

Example VII 200 gms. of a 10% solution of rubber in toluene are heated on a steam bath for two hours with 25 ccs. of a 10% solution of phosphorous pentafluoride in glacial acetic acid. The solution becomes almost black. The product, which can be isolated by precipitation into well stirred rectified spirit, forms a white asbestos wool-like material. The yield is 20 grammes and the product is soluble in benzene and insoluble in acetone.

By the present invention improved and distinctive conversion products of rubber are obtained, having a superior adhesion to tinplate, a pale colour and which are readily soluble in the usual solvents without preliminary milling.

What we claim is:

1. A process for the treatment of rubber consisting in adding boron trifluoride dissolved in acetic acid to a solution of rubber in an inert organic solvent, the acetic acid simultaneously functioning as a dehydrating agent, and subsequently boiling the mixture.

2. A process according to claim 1 wherein the reacted mixture is neutralised with an aqueous solution of sodium carbonate, the solvent removed from the resulting emulsion by steam distillation, and the converted rubber separated, washed and dried.

3. A process according to claim 1, wherein the reaction is continued for a sufficient time to produce a hard non-tacky solid, soluble in aromatic hydrocarbon solvents to give a viscous solution suitable for use as a varnish or lacquer either with or without the addition of plasticisers.

4. A process according to claim 1 wherein the product is dissolved and re-precipitated with acetone or alcohol to give a final product in the form of a white odourless powder, soluble and suitable for the preparation of a varnish.

5. A process for the treatment of rubber consisting in dissolving milled crepe in carbon tetrachloride and mixing therewith a solution of boron trifluoride in acetic acid, the mixture being boiled and, after cooling rendered alkaline by the addition of an aqueous solution of sodium carbonate prior to removal of the solvent by steam distillation.

6. A process according to the preceding claim 5, wherein the product is subsequently washed with hot water until free from salts, the water being then removed by centrifugation and the product dried at low temperature.

7. A process for the treatment of rubber according to claim 1, wherein the reacted mixture is neutralised with solid sodium carbonate and the neutralised liquid separated by decantation, filtration or other suitable means.

8. A process according to claim 1, wherein the milled crepe is dissolved in pure benzene, and after admixture with the solution of boron trifluoride in aceti cacid is boiled for half an hour when the reaction is stopped by the addition of solid sodium carbonate.

9. A process for the treatment of rubber consisting in adding phosphorous pentafluoride to a solution of rubber in toluene, heating the solution and isolating the product by precipitation into rectified spirit.

10. A process for the treatment of rubber consisting in adding a 10% solution of phosphorous penta-fluoride in glacial acetic acid to a 10% solution of rubber in toluene, heating the mixture and obtaining a white asbestos wool-like material by precipitation in rectified spirit.

11. A process for the treatment of rubber comprising dissolving a fluoride of an element of the class of amphoteric electro-negative elements consisting of boron and phosphorus in acetic acid, adding the dissolved fluoride to a solution of rubber in an inert organic solvent in which the acetic acid functions as a dehydrating agent, and subsequently boiling the solution.

12. A process for the treatment of rubber, comprising dissolving a fluoride of an element of the class of amphoteric electro-negative elements consisting of boron and phosphorus in acetic, and adding the dissolved fluoride to a solution of rubber in commercial motor spirit, the motor spirit containing reactive ingredients capable of forming solvent oils when acted on by the fluorine compounds employed to convert the rubber, said acetic acid functioning as a combined dehydrating agent an solvent.

ERNEST HAROLD FARMER.
HENRY POTTER STEVENS.
JAMES WALKER ROWE.